United States Patent
Lee et al.

(10) Patent No.: US 11,043,039 B1
(45) Date of Patent: Jun. 22, 2021

(54) 3D POINT CLUSTER CORRELATION FOR CONTENT ALIGNMENT ON AUGMENTED REALITY PLATFORMS

(71) Applicant: The Boeing Company, Chicago, IL (US)

(72) Inventors: David K. Lee, Garden Grove, CA (US); Paul Robert Davies, Long Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/855,537

(22) Filed: Apr. 22, 2020

(51) Int. Cl.
| | |
|---|---|
| *G09G 5/00* | (2006.01) |
| *G06T 19/00* | (2011.01) |
| *G06T 19/20* | (2011.01) |
| *G06F 17/16* | (2006.01) |
| *G06K 9/62* | (2006.01) |

(52) U.S. Cl.
CPC ............ *G06T 19/006* (2013.01); *G06F 17/16* (2013.01); *G06K 9/6215* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2014/0118339 A1* | 5/2014 | Davies | G06T 15/10 345/419 |
| 2014/0207862 A1* | 7/2014 | Domke | H04L 65/403 709/204 |
| 2019/0108647 A1 | 4/2019 | Lee et al. | |
| 2019/0122438 A1* | 4/2019 | Petrovskaya | G06F 3/017 |
| 2019/0139320 A1* | 5/2019 | Davies | G01B 5/004 |
| 2019/0139932 A1 | 5/2019 | Davies et al. | |

* cited by examiner

*Primary Examiner* — Martin Mushambo
(74) *Attorney, Agent, or Firm* — Yee & Associates, P.C.

(57) ABSTRACT

A method of aligning reference frames for an augmented reality display is provided. The method comprises receiving three or more target images positioned at predefined physical reference points in a specified physical space, wherein the physical reference points are part of a reference frame of the physical space. Distances between the physical reference points of the target images are calculated and compared with distances between virtual reference points comprising a reference frame of a three-dimensional virtual model to create a number of distance comparisons. The physical reference points are correlated with virtual reference points according to the distance comparisons. The reference frame of the physical space is then aligned with the reference frame of the three-dimensional virtual model according to the correlation of the physical reference points and virtual reference points.

23 Claims, 10 Drawing Sheets

$$D = \begin{bmatrix} 0 & d_{1,2} & \circ\circ\circ & d_{1,n-1} & d_{1,n} \\ d_{2,1} & 0 & & d_{2,n-1} & d_{2,n} \\ & \vdots & \ddots & \vdots & \\ d_{n-1,1} & d_{n-1,2} & & 0 & d_{n-1,n} \\ & & \circ\circ\circ & & \\ d_{n,1} & d_{n,2} & & d_{n,n-1} & 0 \end{bmatrix}$$

FIG. 5A $$D = \begin{bmatrix} 0 & d_{1,2} & \circ\circ\circ & d_{1,n-1} & d_{1,n} \\ d_{2,1} & 0 & & d_{2,n-1} & d_{2,n} \\ & \vdots & \ddots & \vdots & \\ d_{n-1,1} & d_{n-1,2} & & 0 & d_{n-1,n} \\ & & \circ\circ\circ & & \\ d_{n,1} & d_{n,2} & & d_{n,n-1} & 0 \end{bmatrix}$$

FIG. 5B $$D = \begin{bmatrix} 0 & d_{1,2} & \circ\circ\circ & d_{1,n-1} & d_{1,n} \\ d_{2,1} & 0 & & d_{2,n-1} & d_{2,n} \\ & \vdots & \ddots & \vdots & \\ d_{n-1,1} & d_{n-1,2} & & 0 & d_{n-1,n} \\ & & \circ\circ\circ & & \\ d_{n,1} & d_{n,2} & & d_{n,n-1} & 0 \end{bmatrix}$$

3D POINT CLUSTER CORRELATION FOR CONTENT ALIGNMENT ON AUGMENTED REALITY PLATFORMS

BACKGROUND INFORMATION

1. Field

The present disclosure relates generally to augmented reality, more specifically, to a method for mapping a surrounding environment to simulated 3D content.

2. Background

Augmented Reality (AR) augments perception of a live video feed by superimposing virtual media. Augmented Reality has been successfully incorporated into many applications including: entertainment, video games, sports, and mobile device applications. Recently, increased interest has been given to the potential gains AR may provide in the realm of production and manufacturing assistance. Recent advancements in wearable technology and computing devices further increase the potential benefits of AR for industrial applications.

AR systems use various techniques to align, or map, virtual objects to corresponding locations in the physical environment. One technique involves identifying several (e.g., 3 or more) fiducial markers in the physical environment and mapping those markers to points in the simulated space.

For example, in some implementations, a unique fiducial mark is created and assigned to a specified physical reference point. Accurate alignment of the physical reference point and virtual reference frames requires the correct placement of each unique marker at its designated reference point or by placing the unique markers on a handheld tool which can be moved to the correct locations. Failure to match each unique marker with its respective reference point can result in alignment errors.

Therefore, it would be desirable to have a method and apparatus that take into account at least some of the issues discussed above, as well as other possible issues.

SUMMARY

An illustrative embodiment of the present disclosure provides a method of aligning reference frames for an augmented reality display. The method comprises receiving three or more target images positioned at predefined physical reference points in a specified physical space, wherein the physical reference points are part of a reference frame of the physical space. Distances between the physical reference points of the target images are calculated and compared with distances between virtual reference points comprising a reference frame of a three-dimensional virtual model to create a number of distance comparisons. The physical reference points are correlated with virtual reference points according to the distance comparisons. The reference frame of the physical space is then aligned with the reference frame of the three-dimensional virtual model according to the correlation of the physical reference points and virtual reference points.

Another illustrative embodiment provides a system for aligning reference frames for an augmented reality display. The system comprises a storage device configured to store program instructions and one or more processors operably connected to the storage device and configured to execute the program instructions to cause the system to: receive three or more target images positioned at predefined physical reference points in a specified physical space, wherein the physical reference points are part of a reference frame of the physical space; calculate distances between the physical reference points of the target images; compare the distances between the physical reference points with distances between virtual reference points comprising a reference frame of a three-dimensional virtual model to create a number of distance comparisons; correlate, according to the distance comparisons, the physical reference points with a number of corresponding virtual reference points; and align, according to the physical reference points and virtual reference points that have been correlated, the reference frame of the physical space with the reference frame of the three-dimensional virtual model.

Another illustrative embodiment provides a computer program product for aligning reference frames for an augmented reality display. The computer program product comprises a non-volatile computer readable storage medium having program instructions stored thereon to perform the steps of: receiving three or more target images positioned at predefined physical reference points in a specified physical space, wherein the physical reference points are part of a reference frame of the physical space; calculating distances between the physical reference points of the target images; comparing the distances between the physical reference points with distances between virtual reference points comprising a reference frame of a three-dimensional virtual model to create a number of distance comparisons; correlating, according to the distance comparisons, the physical reference points with a number of corresponding virtual reference points; and aligning, according to the physical reference points and virtual reference points that have been correlated, the reference frame of the physical space with the reference frame of the three-dimensional virtual model.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that Augmented Reality (AR) content alignment can be accomplished by mapping the surrounding environment to that of the 3D content. This alignment typically occurs by collecting locations in the physical environment and correlating them to the corresponding locations in the simulated 3D content.

The illustrative embodiments recognize and take into account that one common method of aligning physical and virtual reference frame comprises uses of a single fiducial marker in the physical environment. Though logistically simple, small orientation (angle) errors in the positioning of the image collection device relative to the single fiducial marker result in increasingly larger positional errors the farther one moves from the original point of the marker.

The illustrative embodiments recognize and take into account that the potential orientation errors of using a single fiducial marker for AR alignment can be overcome with the use of three or more markers. This approach typically requires the correlation between physical reference points and virtual model reference points to be known in advance by the operator. A unique image marker is preassigned to each physical reference point according its correlation to the virtual model, which requires the operator to collect the correct unique marker at each specified location to avoid alignment errors. When collecting the locations, the operator indicates to the algorithm which specific location is being collected in the physical environment (i.e. correlating real world location to virtual location). If the operator experiences any drift the entire process needs to be re-completed, forcing the operator to remember where the locations were and in what order they need to be collected. If a unique marker is misplaced or accidentally swapped with another marker, it could be unusable (or at least detrimental) to the alignment process.

The illustrative embodiments also recognize and take into account the collection of unique markers is often performed with a handheld device (e.g., a "wand") that can store and display the unique markers for collection at each reference point. Holding such a handheld wand in place and collecting/capturing the mark is typically a two-person job. Furthermore, the use of a wand introduces a foreign object into the physical work environment, which increases the potential for foreign object damage (FOD).

The illustrative embodiments provide of method of AR alignment between physical and virtual reference frames using automated correlation based on distances between collected reference points. The correlation based on distance alleviates operators of having to know the correlations in advance and allows the use of identical image targets as fiducial markers.

The use of identical markers also allows the references points in the physical environment to be collected in any order. As the operator moves away from the originally collected reference points, alignment can be updated to maintain accuracy by collecting a new reference point closer the operator's new position. By having multiple copies of the same marker pre-placed throughout the workspace, reliance on a handheld tool is reduced or essentially eliminated (e.g., not required), allowing the operator to focus on other tasks and reducing FOD risks.

Figure 1:
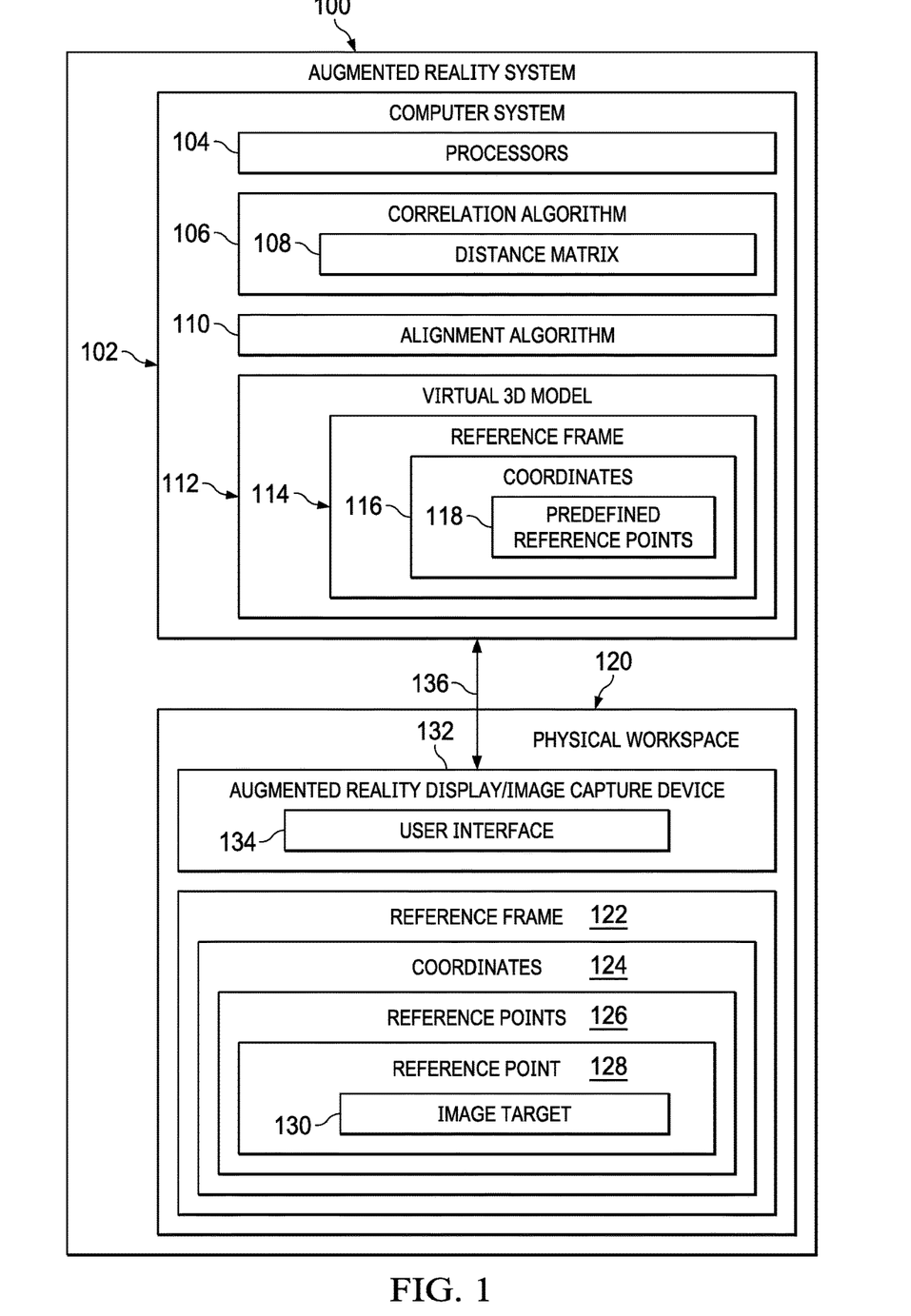
FIG. 1 is an illustration of a block diagram of an augment reality alignment system in accordance with an illustrative embodiment.

Turning now to FIG. 1, an illustration of a block diagram of an augment reality alignment system in accordance with an illustrative embodiment. Augmented reality (AR) system 100 comprises a computer system 102 that is able to align the reference frame 114 of a virtual 3D model of 112 of a product such as an aircraft or other vehicle with a reference frame 122 of a physical workspace 120 so that the two can be viewed superimposed with each other in interface 134 of AR display/capture system 132 as if they were physically integrated.

Physical reference frame 122 comprises a number of coordinates 124. Among coordinates 124 are a number of reference points 126 chosen to align the workspace 120 with virtual model 112. Typically, three or more reference points 126 are used for an initial alignment. Reference points 126 correspond with predefined reference points 118 in virtual 3D model 112.

Like physical workspace 120, virtual 3D model 112 has a reference frame 114 comprising a number of coordinates 116. Typically, at least a portion of physical workspace 120 is mapped in virtual 3D model 112 such that coordinates 116 in the model 112 correspond to coordinates 124 (or a subset thereof) in physical workspace 120.

Predefined reference points 118 can be selected from coordinates 116 according to an anticipated workflow within physical workspace 120 before work has begun. Selecting predefined references points 118 in advance allows an image target 130 to be placed at the corresponding reference points 126 in physical workspace 120 in a one-time process, although reference points can be subsequently added and/or deleted as needed. Predefined reference points 118 can be chosen based on corresponding reference points 126 that will likely be available/visible through the life of a build, thereby reducing the subsequent need to add or remove image targets.

An image target 130 is then placed at each reference point 128 corresponding to predefined reference points 118 in virtual 3D model 112. Each image target 130 can be captured with AR display/capture device 132. AR display/capture device 132, as used herein, refers to a device that is able to capture visual images of physical objects and environments and display virtual images superimposed on those physical objects and environments. The capture device 132 might be, e.g., a mobile phone, a tablet computer, a wearable device such as an AR headset, "smart" glasses, etc. Three image targets might be captured to perform the initial correlation and alignment of reference frame 114 with reference frame 122. If the image targets are pre-placed at reference points 126 in advance, additional image targets merely have to be captured with capture device 132 to update alignment as the operator moves through physical workspace 120. In an illustrative embodiment, the image targets placed at references points 126 can be identical to each other.

Communications link 136 allows data exchange between the AR capture device 132 and computer system 102. Communications link 136 might be a wireless or physical connection between AR capture device 132 and computer system 102.

A number of processors 104 in computer system 102 are configured to execute correlation algorithm 106, which correlates reference points 126 in physical workspace 120 to predefined reference points 118 in virtual 3D model 112. This correlation is accomplished via distance matrix 108.

After the reference points 126 in the physical workspace 120 are correlated with predefined reference points 118 in the virtual 3D model 112, alignment algorithm 112 aligns the two reference frames 114, 122, allowing the virtual 3D model 112 to be visually superimposed on physical workspace 120 and displayed in interface 134 on AR device 132.

As the operator moves away from the initially captured reference points 126 in physical workspace 120, the AR device 132 can be used to capture additional reference points in the workspace, which can be used by alignment algorithm 110 to update the alignment of the references frames 114, 122 to keep the alignment accurate.

Figure 2:
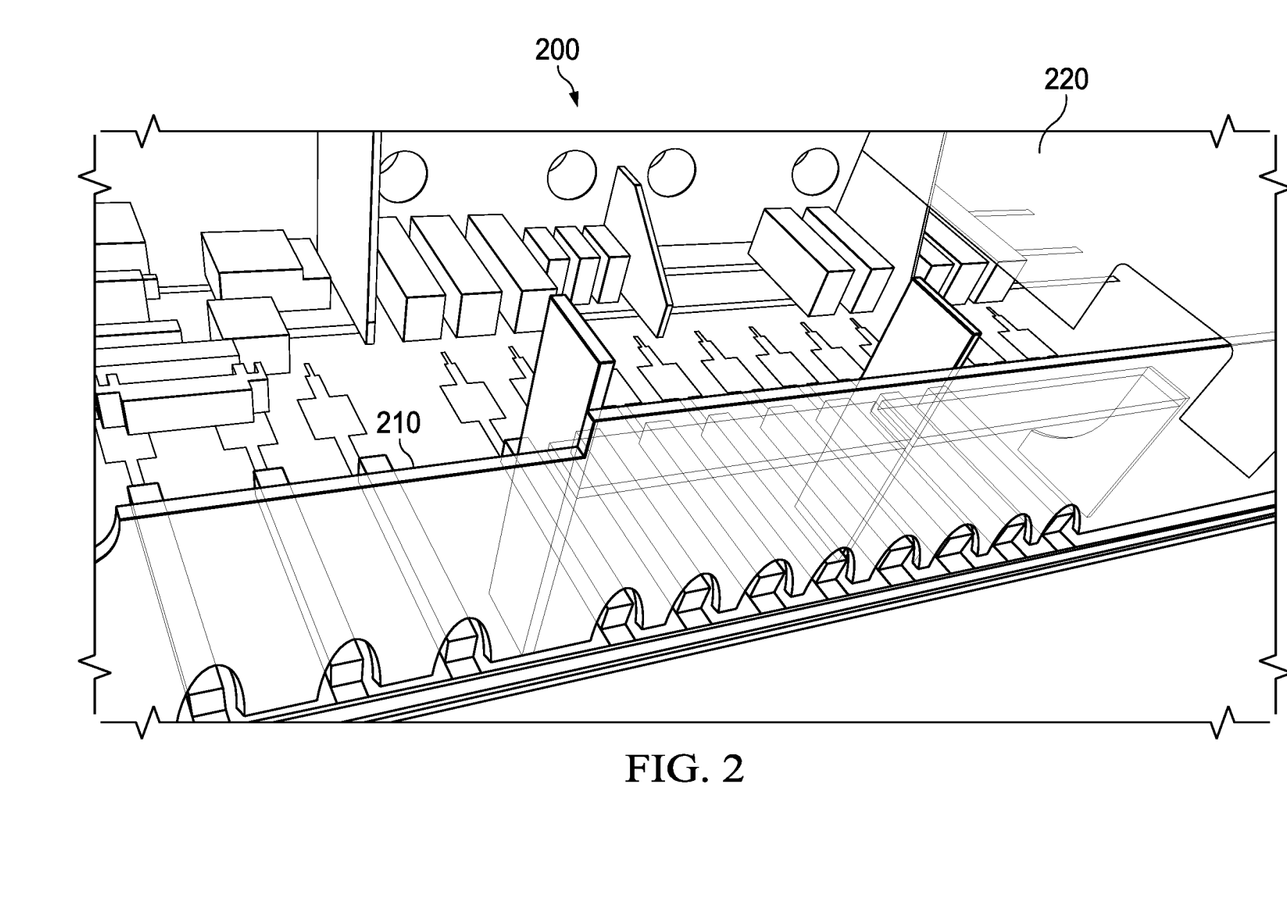
FIG. 2 depicts an image of a panel assembly augmented by simulated, 3D content in accordance with an illustrative embodiment.

FIG. 2 depicts an image of a panel assembly augmented by simulated, 3D content in accordance with an illustrative embodiment. Satellite assembly 200 might be an example of physical environment 120 in FIG. 1.

In this example, a physical satellite panel assembly 200 has been created. The physical panel 200 is augmented by simulated 3D close out panels 210 and 220 that are visible when the panel 200 is viewed through a special camera or other AR-capable device (e.g., AR headset).

The AR simulation can be dynamic, meaning that as the camera moves and rotates, and the view of the simulated 3D panels 210, 220 will change to match the perspective of the camera as if they are physical objects in front of the camera. The augmented scene in FIG. 2 is capable of being interacted with by the user and can provide valuable instructional information during the manufacturing process.

Figure 3:
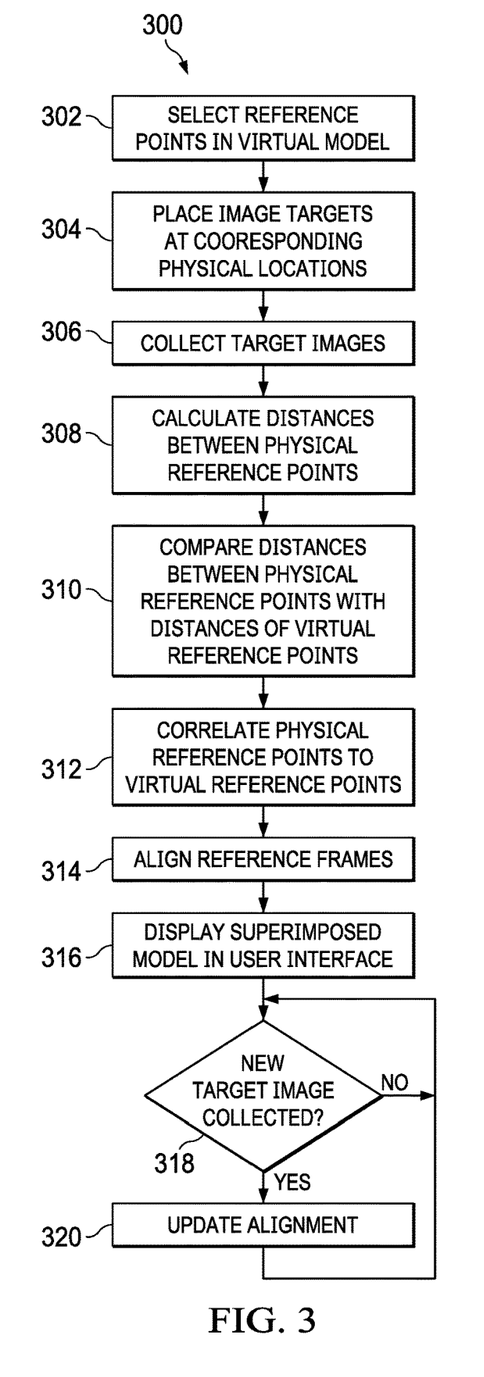
FIG. 3 depicts a flowchart of a process of aligning simulated 3D content with a physical reference frame in accordance with an illustrative embodiment.

FIG. 3 depicts a flowchart of a process of aligning simulated 3D content with a physical reference frame in accordance with an illustrative embodiment. Process 300 can be implemented with an augmented reality system such as augmented reality system 100 shown in FIG. 1.

Process 300 begins by selecting virtual reference points in the virtual model that correspond with physical reference points in a physical environment that is mapped in the model (step 302). The reference points can be selected based on the anticipated activity in the physical environment including where operators are likely to move within the environment and how activity is likely to progress within the environment over time. Depending on the circumstances, reference points can be selected that will remain accessible/visible within the environment for the duration of planned activity.

With the virtual reference points selected and predefined in the virtual model, process 300 then proceeds to placing image targets at corresponding locations of physical reference point in the physical environment, wherein the physical reference points are part of a reference frame of the physical environment/space (step 304). Since the selected reference points are known in advance, the image targets can be placed at the respective physical reference points at the same time in one process step before work/activity in the physical environment has begun. The preplacement of image targets in the physical environment can reduce or eliminate the need to interrupt the workflow to add new image targets/markers, although image targets can be added or removed as needed.

Because correlation between physical reference frame 122 and virtual reference frame 114 is based only on distances between collected points (explained in detail below), the image targets can be identical to each other. The preplacement of identical image targets throughout the physical environment eliminates the need for an operator to know the correlations between specific physical and virtual locations in advance as well as the need to collect a unique image preassigned to each physical reference point. Furthermore, without a need to collect a unique image/marker for each location, the operator does not have to carry a handheld device such as a "wand" to generate the unique images for capture at each point, thereby reducing the probability of FOD in the physical work environment.

Next, the image targets located at three or more physical reference points are captured (collected) in the work environment by using a capture device positioned over the image targets (step 306). The capture device might be, e.g., a mobile phone, a tablet computer, a wearable device such as an AR headset, "smart" glasses, etc. The first point collected, which can be any of the image targets, is treated as collected point 1, the second point is treated as collected point 2, and the third as collected point 3, etc. The points do not have to be collected in any preset sequence.

The system calculates distances between the physical reference points of the target images (step 308). The distances between the physical reference points of the target images are then compared with distances between virtual reference points comprising the reference frame of the corresponding three-dimensional virtual model to create a number of distance comparisons (step 310). The distance comparisons determine the degree to which respective distances between the physical reference points match respective distances between virtual reference points.

Based on the distance comparisons in step 310, a correlation algorithm correlates the physical reference points with a number of corresponding virtual reference points (step 312).

After the physical reference points collected from the physical workspace have been correlated with the virtual reference points in the reference frame of the virtual model, an alignment algorithm performs a least-squares fit type process on the physical reference points and virtual reference points in the database to align the reference frame of the physical space with the reference frame of the three-dimensional virtual model (step 314). The alignment provides a transformation mapping between the physical reference frame and the virtual model reference frame, allowing the content to be spatially registered to the physical environment for display on an AR device.

The virtual model is displayed superimposed on the physical space in a user interface (step 316). Alignment updates can be conducted simply by naturally moving around the work area and passively collecting with a capture device image targets that happen to be placed nearby. The system checks for the collection of new image targets (step 318), and when a new image target is captured, the alignment algorithm updates the alignment (step 320). This alignment update is seamless and transparent to the user, allowing the user to focus on value added tasks. Because the database points are aligned to the physical workspace, these updates do not require the correlation algorithm to be run again, although it can if needed.

Process 300 provides several technical improvements over the prior art. Because the identical markers are placed at known locations around the physical workspace, there is less logistical overhead for the operator to place the image targets since the operator only has to focus on location rather than location and unique image targets based a correlation known in advance. Collection of the locations in the workspace can be performed with a simple capture using a device (e.g., gaze and gesture with an AR headset), while the solution is calculated, and the content aligned, automatically.

Furthermore, updates to alignment only require collection of one new point instead of three or more new points. After correlation of the initial points, each subsequently collected point is used to update the alignment, without need to re-correlate the reference frames. The alignment is updated using a specified number of most relevant points according to a number of empirical weighting metrics (e.g., distance from current point, time since a point was collected, etc.). For example, the alignment update might be performed using the three most recently scanned targets or the three closest targets to the user. Alternatively, the alignment update might use all collected points as the user captures additional targets. This update of alignment occurs seamlessly to the operator as the operator moves around the physical work environment. For example, as the operator moves farther from the location of the originally collected points, the operator need only collect a new point near the operator's current location in order to maintain an accurate alignment.

Figure 4:
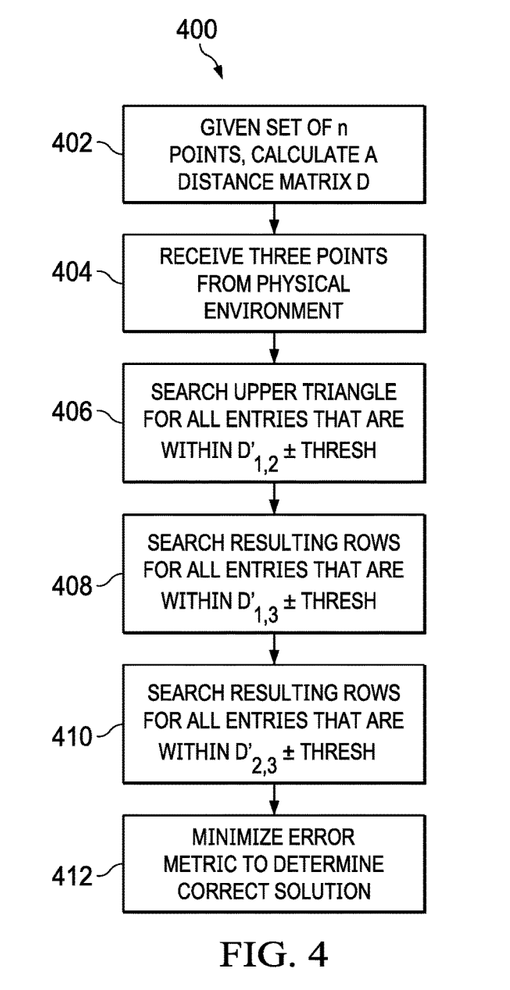
FIG. 4 depicts a flowchart of a process for correlating physical reference points in workspace with corresponding points in a reference frame of a virtual model in accordance with an illustrative embodiment.

FIG. 4 depicts a flowchart of a process for correlating physical reference points in workspace with corresponding points in a reference frame of a virtual model in accordance with an illustrative embodiment. FIG. 4 is a more detailed explanation of step 312 in FIG. 3. The algorithm responsible for correlating the collected points from the work location with the corresponding points from the virtual/CAD model reference frame is an algorithm based on simple distances between points.

Process 400 begins with a given set of n points in the reference frame of the virtual model and calculates a distance matrix, D (step 402).

Figure 5A:
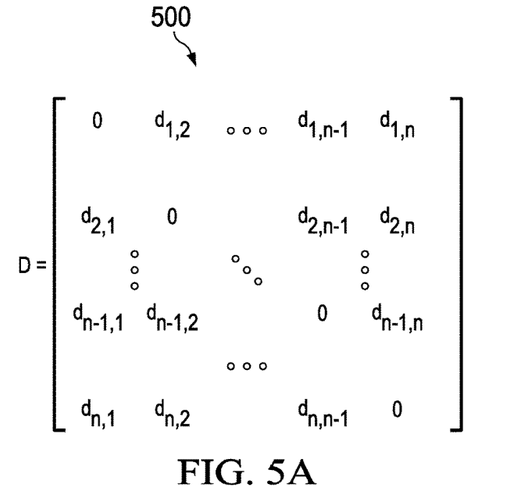
FIG. 5A illustrates a distance matrix in accordance with an illustrative embodiment.

FIG. 5A illustrates a distance matrix in accordance with an illustrative embodiment. Each row, column pair (i, j) in distance matric D 500 indicates the distance between location i and location j in the virtual reference frame. The matrix is symmetric with a 0 diagonal. Each matrix contains n(n−1)/2 unique entries:

$$d_{i,j} = d_{j,i} \forall 1 \leq i, j \leq n$$

where n is the number of points.

Figure 6:
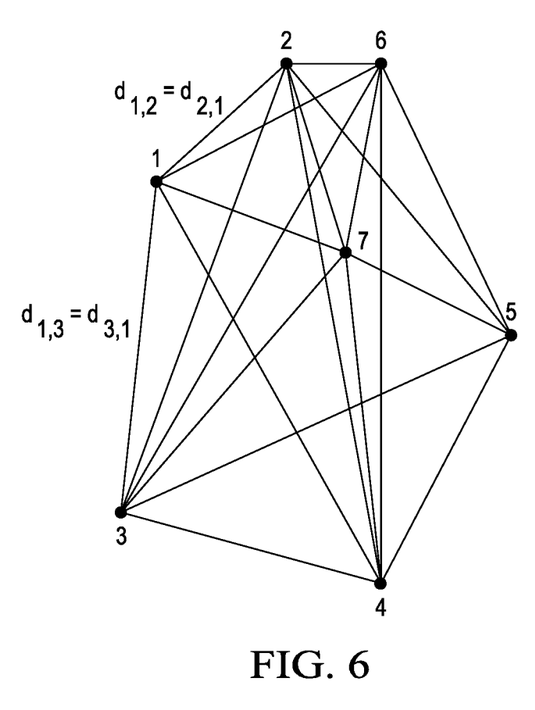
FIG. 6 illustrates a number of points in a reference frame represented by the distance matrix D in accordance with an illustrative embodiment.

FIG. 6 illustrates a number of points in a reference frame represented by the distance matrix D in accordance with an illustrative embodiment.

In the present example, the correlation algorithm receives three points collected from the physical work environment that were collected in step 306 in FIG. 3 (step 404). The first collected point is designated as point 1, the second collected point as point 2, and the third collected point as point 3. The distance between collected point 1 and collected point 2 is denoted $d'_{1,2}$. The distance between collected point 1 and collected point 3 is $d'_{1,3}$. The distance between collected point 2 and collected point 3 is $d'_{2,3}$.

Figure 5B:
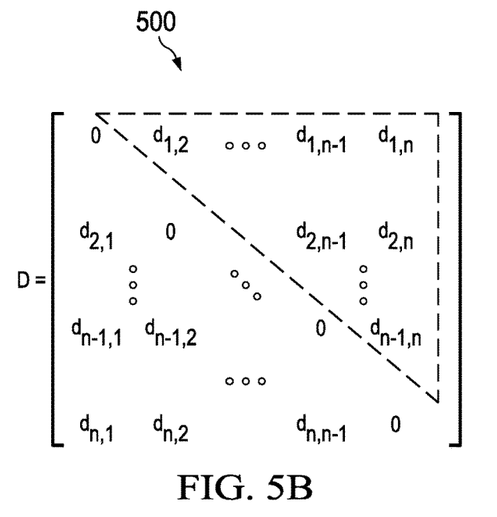
FIG. 5B highlights an upper triangle of the distance matrix searched for matching points in accordance with an illustrative embodiment.

Next, the correlation algorithm searches the upper triangle of distance matrix D 500 (shown in FIG. 5B) for all entries that are within a distance of each other that falls within the distance between physical reference points 1 and 2 ($d'_{1,2}$±thresh (an error threshold)) (step 406).

An example of pseudo code for step 406 is:

```
for (i=0; i<n, i++)
{
    for (j=i+1; j<n, j++)
    {
        if (abs(D[i, j]–d'_{1,2})<thresh)
        {
            indexList1.Add(i, j)
        }
    }
}
```

This search returns a list of all points that potentially match $d'_{1,2}$. For example, if the sorted, unique list was 1, 2, 5, 6, then points 1, 2, 5, 6 are indices forming a first index list (indexList 1) of the potential matches for collected points 1 and 2 (i.e., $d'_{1,2}$).

Figure 5C:
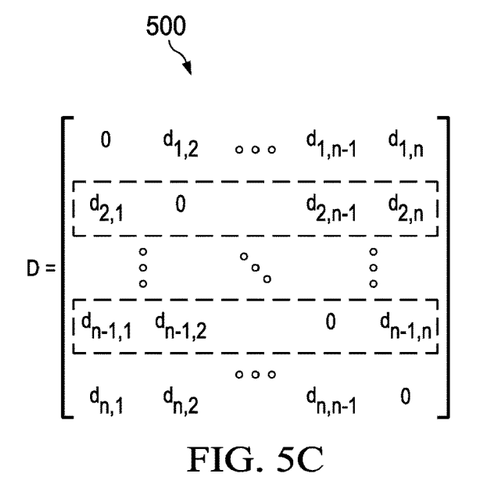
FIG. 5C highlights rows of the distance matrix searched for matching points in accordance with an illustrative embodiment.

The correlation algorithm then searches the resulting rows from step 406 for all entries that are within $d'_{1,3}$±thresh, shown in FIG. 5C (step 508).

An example of pseudo code for step 408 is:

```
for (i in indexList1)
{
    for (j=0; j<n, j++)
    {
        if (abs(D[i, j]–d'_{1,3})<thresh)
        {
            indexList2.Add(i, j)
        }
    }
}
```

This search returns a list of all points that potentially match $d'_{1,3}$. Step 408 searches a subset of the matrix D 500, as opposed to step 406, which searches the upper triangle. For example, if the sorted, unique list is 1, 2, 7, then points 1, 2, 7 are indices forming a second index list (indexList 2) of the potential matches for collected points 1 and 3 (i.e., $d'_{1,3}$). The set of points 1, 2, and 7 that potentially match $d'_{1,3}$ form a second index list (indexList 2).

The correlation algorithm then searches the resulting rows from step 408 for all entries that are within $d'_{2,3}$±thresh (step 410).

Example pseudo code for step 410 is:

```
for (i in indexList2)
{
    for (j=0; j<n, j++)
    {
        if (abs(D[i, j]–d'_{2,3})<thresh)
        {
            indexList3.Add(i, j)
        }
    }
}
```

This search returns a list of all points that potentially match $d'_{2,3}$. Like step 408, step 410 searches a subset of matrix 500, as opposed to searching the upper triangle. For example, if the sorted, unique list is 2, 3, 7, then points 2, 3, 7 are indices forming a third index list (indexList 3) of the potential matches for collected points 2 and 3 (i.e., $d'_{2,3}$).

With the index lists, the following are known: indexList1 contains the indices of all points that can potentially match $d'_{1,2}$; indexList2 contains the indices of all points that can potentially match $d'_{1,3}$; indexList3 contains the indices of all points that can potentially match $d'_{2,3}$.

This knowledge implies that all the potential matches for collected point 1 should be contained in the intersection of indexList1 and indexList2. In the above example, this intersection is: $\{1, 2, 5, 6\} \cap \{1, 2, 7\} = \{1, 2\}$.

Similarly, all the potential matches for collected point 2 should be contained in the intersection of indexList1 and indexList3. In the present example, the intersection is: $\{1, 2, 5, 6\} \cap \{2, 3, 7\} = \{2\}$.

Finally, all the potential matches for collected point 3 should be contained in the intersection of indexList2 and indexList3. In the present example, this intersection is: $\{1, 2, 7\} \cap \{2, 3, 7\} = \{2, 7\}$.

Since there is more than one possible solution, the correlation algorithm minimizes an error metric to determine the correct solution (step 412). For example, the correlation algorithm might minimize the error metric:

$$\text{Error} = \min\left(\sqrt{(d'_{1,2} - \text{dist}(i, j))^2 + (d'_{1,3} - \text{dist}(i, j))^2 + (d'_{2,3} - \text{dist}(i, j))^2}\right)$$

The solution (index i, j, k) that minimizes the error should be the correct correlation. Collected point 1 will correspond to the $i^{th}$ entry in the image target position database, collected point 2 will correspond to the $j^{th}$ entry in the image target position database, and collected point 3 will correspond to the kth entry in the image target position database. It should be noted that the above error metric is an example, and other metrics can be used for process 400.

Now that the three points are correlated, the alignment algorithm can be run and all points in the database will be roughly located near their appropriate image target. Subsequent image target position collections need not go through this algorithm again, since the location should be in close proximity now.

The AR correlation and alignment method of the illustrative embodiments can be applied to a variety of settings. These settings might include research facilities and manufacturing/maintenance environments. The manufacturing/maintenance environments might range from those for smaller scale items such as automobiles or satellites, such as the satellite example shown in FIG. 2, to large scale environments such as those associated with aircraft manufacture or shipbuilding.

Figure 7:
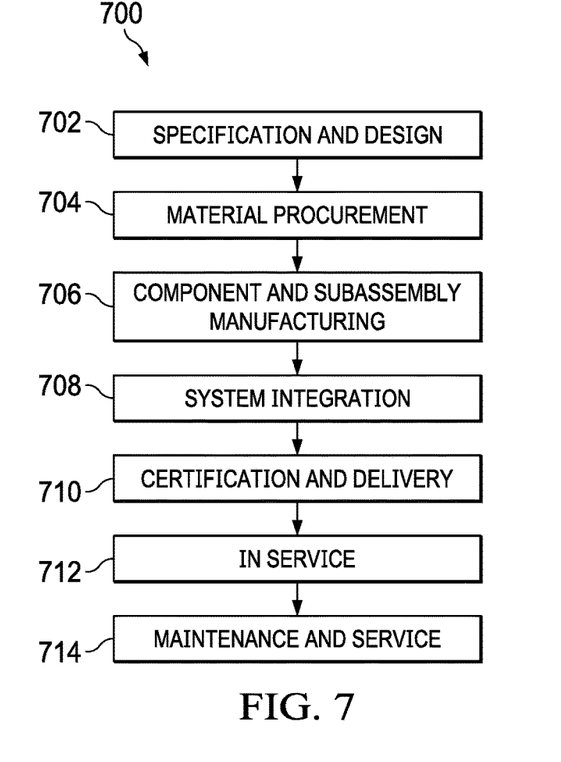
FIG. 7 is an illustration of an aircraft manufacturing and service method in a form of a block diagram in accordance with an illustrative embodiment.
Figure 8:
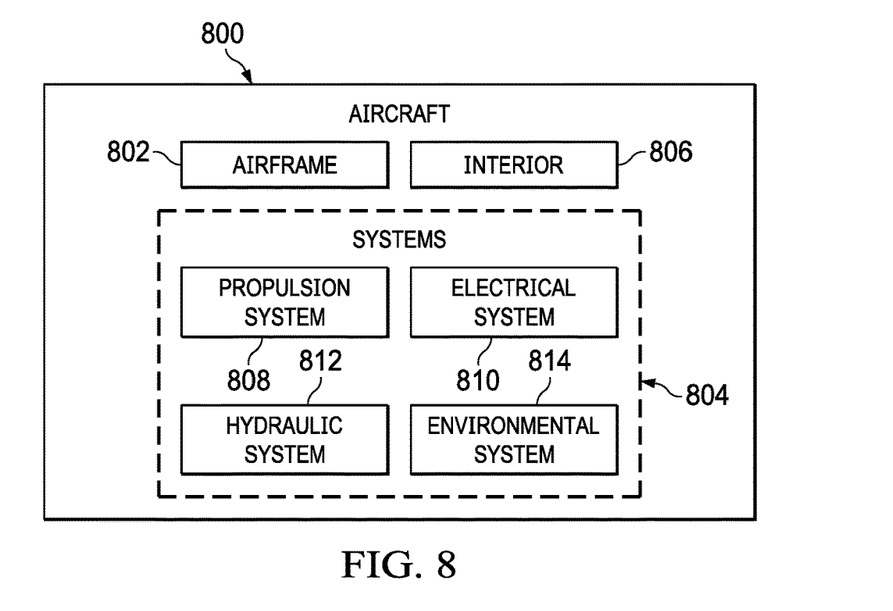
FIG. 8 is an illustration of an aircraft in a form of a block diagram in which an illustrative embodiment may be implemented.

Illustrative embodiments of the present disclosure may be described in the context of aircraft manufacturing and service method 700 as shown in FIG. 7 and aircraft 700 as shown in FIG. 8. Turning first to FIG. 7, an illustration of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 87, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700. One or more illustrative embodiments may be manufactured or used during at least one of component and subassembly manufacturing 706, system integration 708, in service 712, or maintenance and service 714 of FIG. 7.

Figure 9:
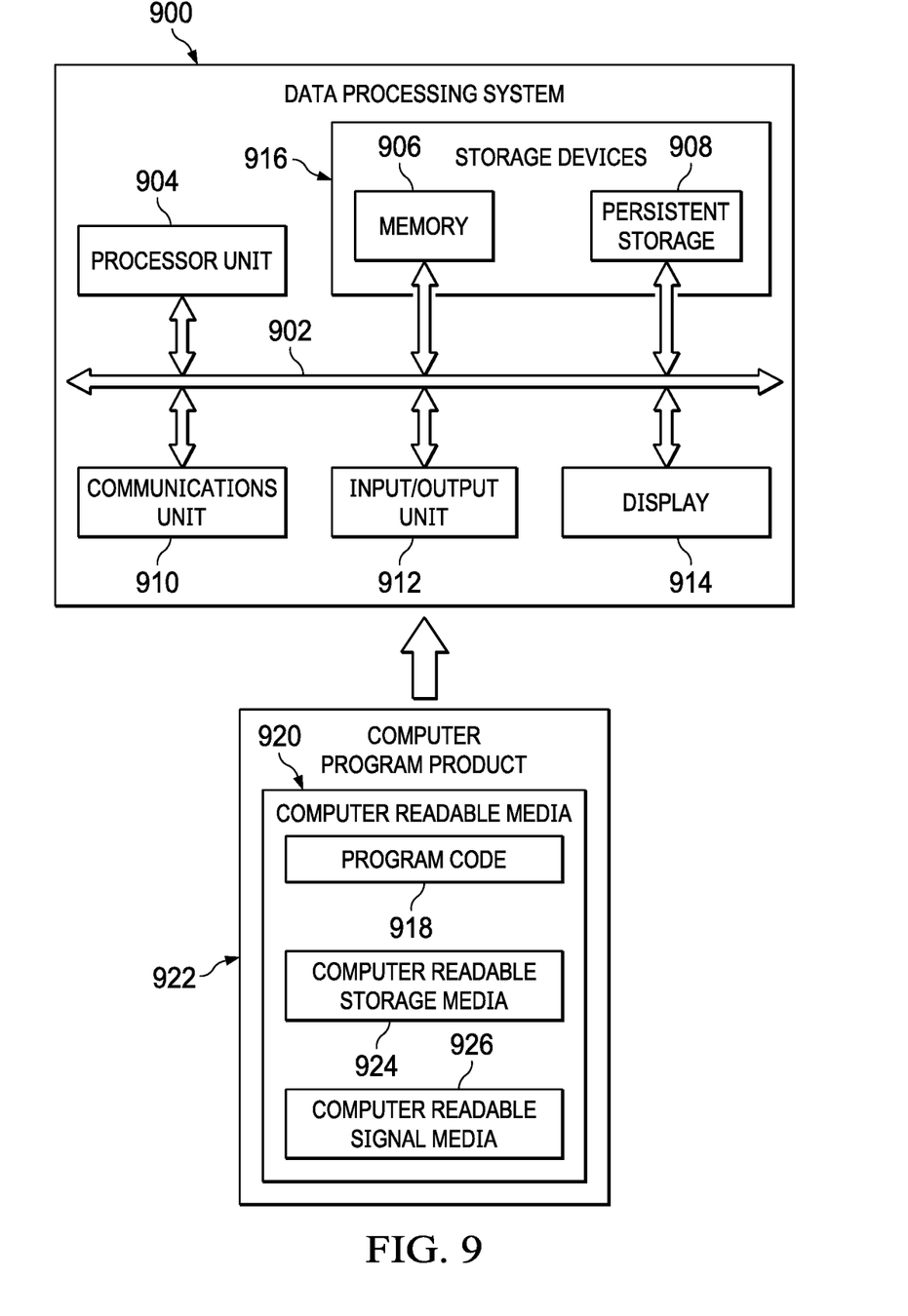
FIG. 9 depicts a block diagram of a data processing system in accordance with an illustrative embodiment.

Turning now to FIG. 9, an illustration of a block diagram of a data processing system is depicted in accordance with an illustrative embodiment. Data processing system might be an example of computer system 102 in FIG. 1. Data processing system 900 might be used to implement one or more computers to carry out process steps shown in FIGS. 3 and 4. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. Processor unit 904 might be an example implementation of processors 104 in FIG. 1. In an embodiment, processor unit 904 comprises one or more conventional general-purpose central processing units (CPUs). In an alternate embodiment, processor unit 904 comprises a number of graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. Computer program product 922 might be for aligning reference frames for an augmented reality (AR) display. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Figure 10A:
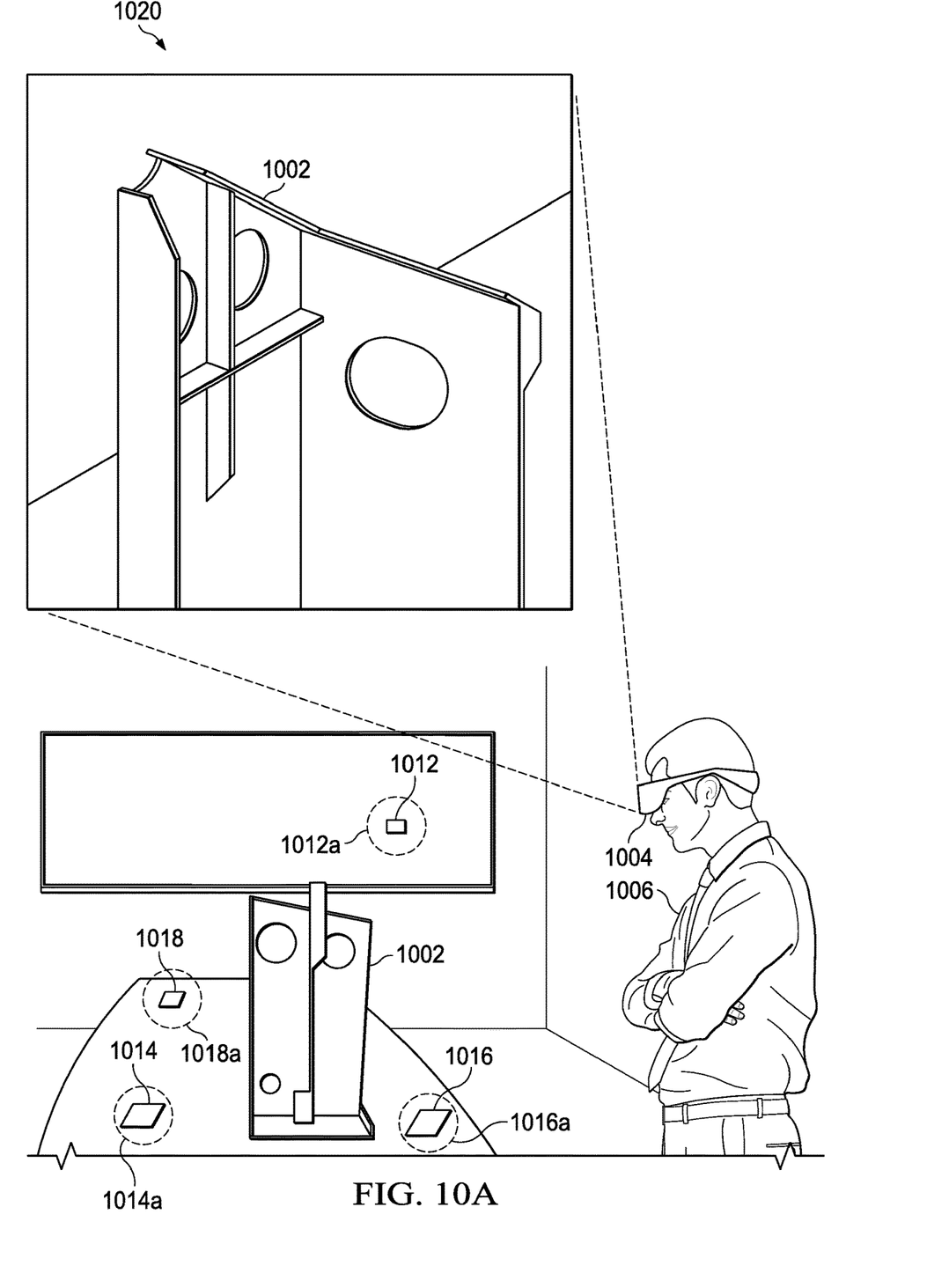
FIG. 10A illustrates an AR display in accordance with an illustrative embodiment.

FIG. 10A illustrates an AR display in accordance with an illustrative embodiment. In this example, user 1006 is viewing structure 1002 through AR headset 1004. AR headset might be an example of AR display/image capture device 132 in FIG. 1.

Display 1020 illustrates the user's view through AR headset 1004. Display 1020 might be an example of user interface 134 in FIG. 1. In FIG. 10A, user 1006 has not yet added any AR generated images over frame 1002. Therefore, structure 1002 appears the same in display 1020 as it does when viewed without the AR headset 1004.

Also shown in FIG. 10A are image targets 1012, 1014, 1016, 1018 which might be examples of image target 130 in FIG. 1. Image targets 1012, 1014, 1016, 1018 are placed at respective predefined reference points 1012a, 1014a, 1016a, 1018a in the physical environment around structure 1002. Image targets 1012, 1014, 1016, 1018 can be captured by user 1006 by viewing the image target through the AR headset 1004 and making a predetermined capture gesture.

Figure 10B:
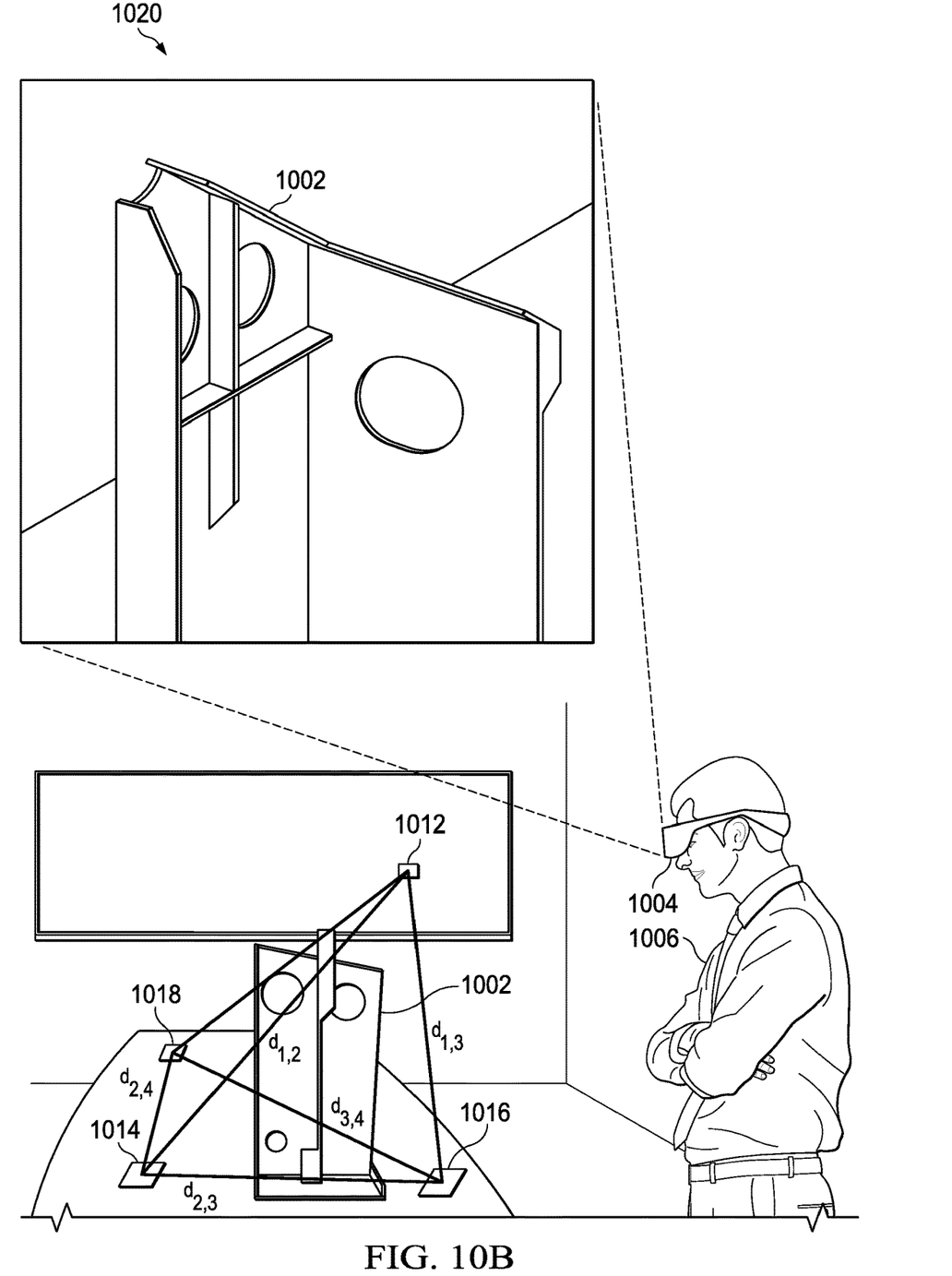
FIG. 10B illustrates the determine of distances between target images used to generate AR images in an AR display in accordance with an illustrative embodiment.

FIG. 10B illustrates the determine of distances between the target images 1012, 1014, 1016, 1018 used to generate AR images in AR display 1020 in accordance with an illustrative embodiment. After the target images 1012, 1014, 1016, 1018 are captured by the user 1006 with AR headset 1004, a computer system in communication with the headset 1004, such as, e.g., computer system 102 in FIG. 1, can determine the distances between the reference points of the target images captured image targets.

The respective distances $d_{1,2}$, $d_{1,4}$, $d_{2,3}$, $d_{2,4}$, $d_{3,4}$ between each possible pair of target images 1012, 1014, 1016, 1018 are shown in FIG. 10B. The target images 1012, 1014, 1016, 1018 correspond to predefined reference points in a reference frame represented by a distance matrix, similar to the reference points shown in FIG. 6. From this correspondence, the computer system can align the physical reference frame of structure 1002 with a virtual reference frame as explained above in reference to FIG. 3.

Figure 10C:
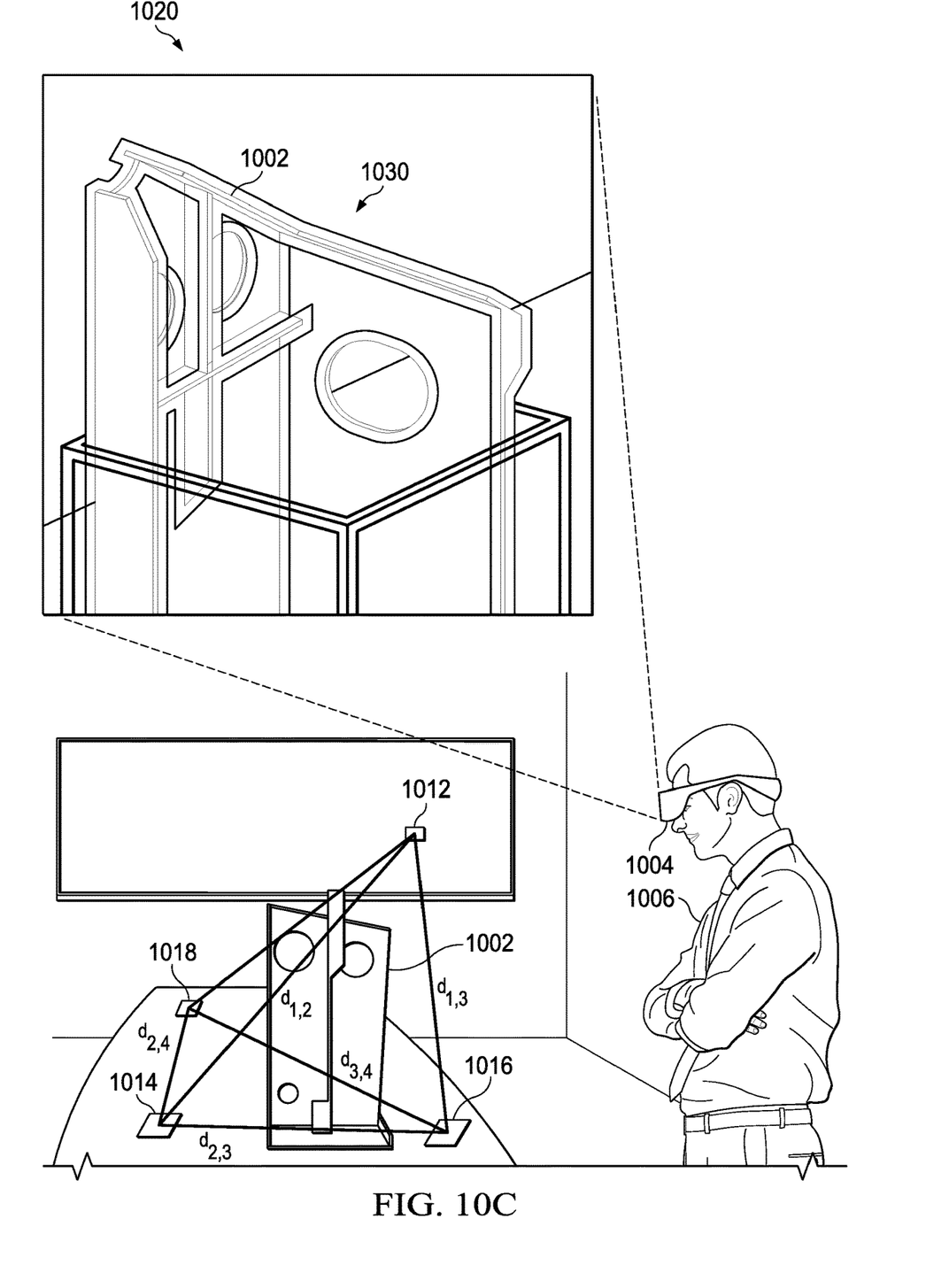
FIG. 10C illustrates a virtual image superimposed on a structure in an AR display in accordance with an illustrative embodiment.

FIG. 10C illustrates a virtual image 1030 superimposed on the structure 1002 in AR display 1020 in accordance with an illustrative embodiment. After the alignment of the physical reference frame and virtual reference frame, the computer system is able to accurately superimpose virtual image 1030 over structure 1002 in display 1020. Addition virtual images might be added or removed from display 1020 through user commands.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of aligning reference frames for an augmented reality (AR) display, the method comprising:
    using one or more processors to perform the steps of:
        receiving three or more target images positioned at predefined physical reference points in a specified physical space, wherein the physical reference points are part of a reference frame of the physical space;
        calculating distances between the physical reference points of the target images;
        comparing the distances between the physical reference points with distances between virtual reference points comprising a reference frame of a three-dimensional virtual model to create a number of distance comparisons;
        correlating, according to the distance comparisons, the physical reference points with a number of corresponding virtual reference points; and
        aligning, according to the physical reference points and virtual reference points that have been correlated, the reference frame of the physical space with the reference frame of the three-dimensional virtual model.

2. The method of claim 1, further comprising displaying in a user interface, the virtual model superimposed on the physical space.

3. The method of claim 1, wherein the target images are identical.

4. The method of claim 1, further comprising:
    receiving a new target image at a new reference point in the specified physical space; and
    updating alignment of the virtual model with the physical space according to the new reference point in relation to previous reference points.

5. The method of claim 1, wherein correlating the reference points of the target images with reference points in the virtual model comprises:
    constructing a distance matrix of known reference points in the virtual model; and
    comparing the distances between the target image reference points in the physical space with the distance matrix.

6. The method of claim 5, further comprising:
    for each distance between two target image reference points, creating an index list of points in the distance matrix that are within a distance of each other that falls within the distance between target image reference points.

7. The method of claim 6, further comprising:
    comparing each index list with the other index lists;
    determining an intersection between each pair of compared index lists, wherein the intersection comprises reference points in the virtual model that potentially correspond to the reference points in the physical space; and
    minimizing an error metric of the intersections to identify the reference points in the virtual model that correspond to the reference points in the physical space.

8. The method of claim 6, wherein after an index list is created for a first distance between two target image reference points, a subset of the distance matrix is searched for each subsequent distance between two target image reference points.

9. A system for aligning reference frames for an augmented reality (AR) display, the system comprising:
    a storage device configured to store program instructions; and
    one or more processors operably connected to the storage device and configured to execute the program instructions to cause the system to:
        receive three or more target images positioned at predefined physical reference points in a specified physical space, wherein the physical reference points are part of a reference frame of the physical space;
        calculate distances between the physical reference points of the target images;
        compare the distances between the physical reference points with distances between virtual reference points comprising a reference frame of a three-dimensional virtual model to create a number of distance comparisons;
        correlate, according to the distance comparisons, the physical reference points with a number of corresponding virtual reference points; and
        align, according to the physical reference points and virtual reference points that have been correlated, the reference frame of the physical space with the reference frame of the three-dimensional virtual model.

10. The system of claim 9, wherein the processor further executes instructions to display in a user interface, the virtual model superimposed on the physical space.

11. The system of claim 10, wherein the target images are identical.

12. The system of claim 10, further comprising:
    receiving a new target image at a new reference point in the specified physical space; and updating alignment of the virtual model with the physical space according to the new reference point in relation to previous reference points.

13. The system of claim 10, wherein correlating the reference points of the target images with reference points in the virtual model comprises:
constructing a distance matrix of known reference points in the virtual model; and
comparing the distances between the target image reference points in the physical space with the distance matrix.

14. The system of claim 13, further comprising:
for each distance between two target image reference points, creating an index list of points in the distance matrix that are within a distance of each other that falls within the distance between target image reference points.

15. The system of claim 13, further comprising:
comparing each index list with the other index lists;
determining an intersection between each pair of compared index lists, wherein the intersection comprises reference points in the virtual model that potentially correspond to the reference points in the physical space; and
minimizing an error metric of the intersections to identify the reference points in the virtual model that correspond to the reference points in the physical space.

16. A computer program product for aligning reference frames for an augmented reality (AR) display, the computer program product comprising:
a non-volatile computer readable storage medium having program instructions stored thereon to perform the steps of:
receiving three or more target images positioned at predefined physical reference points in a specified physical space, wherein the physical reference points are part of a reference frame of the physical space;
calculating distances between the physical reference points of the target images;
comparing the distances between the physical reference points with distances between virtual reference points comprising a reference frame of a three-dimensional virtual model to create a number of distance comparisons;
correlating, according to the distance comparisons, the physical reference points with a number of corresponding virtual reference points; and
aligning, according to the physical reference points and virtual reference points that have been correlated, the reference frame of the physical space with the reference frame of the three-dimensional virtual model.

17. The computer program product of claim 16, further comprising instructions for displaying in a user interface, the virtual model superimposed on the physical space.

18. The computer program product of claim 17, wherein the target images are identical.

19. The computer program product of claim 17, further comprising:
receiving a new target image at a new reference point in the specified physical space; and
updating alignment of the virtual model with the physical space according to the new reference point in relation to previous reference points.

20. The computer program product of claim 17, wherein correlating the reference points of the target images with reference points in the virtual model comprises:
constructing a distance matrix of known reference points in the virtual model; and
comparing the distances between the target image reference points in the physical space with the distance matrix.

21. The computer program product of claim 20, further comprising:
for each distance between two target image reference points, creating an index list of points in the distance matrix that are within a distance of each other that falls within the distance between target image reference points.

22. The computer program product of claim 21, further comprising:
comparing each index list with the other index lists;
determining an intersection between each pair of compared index lists, wherein the intersection comprises reference points in the virtual model that potentially correspond to the reference points in the physical space; and
minimizing an error metric of the intersections to identify the reference points in the virtual model that correspond to the reference points in the physical space.

23. The computer program product of claim 21, wherein after an index list is created for a first distance between two target image reference points, a subset of the distance matrix is searched for each subsequent distance between two target image reference points.

\* \* \* \* \*